United States Patent Office 2,871,261
Patented Jan. 27, 1959

2,871,261
ESTERS OF VITAMIN A

Heinrich Kläui, Riehen, near Basel, Switzerland, assignor to Hoffmann-La Roche Inc., Nutley, N. J., a corporation of New Jersey No Drawing. Application January 9, 1957
Serial No. 633,181

Claims priority, application Switzerland January 16, 1956

6 Claims. (Cl. 260—485)

The present invention relates to new esters of vitamin A and a method for the preparation of these esters.

Generally, the object of the present invention is to provide new compounds having the general formula

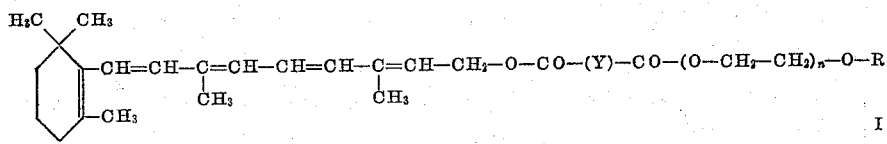

wherein Y represents a divalent radical selected from the group consisting of saturated and unsaturated alkylene radicals containing from 2 to 3 carbon atoms, $n$ represents a number from about 4 to about 45, and R represents a member selected from the group consisting of alkyl and the radical

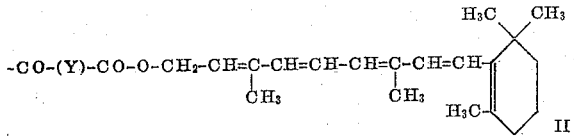

wherein Y has the meaning as defined above.

Another object of this invention is to provide new compounds of Formula I wherein R is alkyl and $n$ is a number from about 6 to about 17.

A further object of the present invention is to provide new compounds of Formula I wherein R is the radical

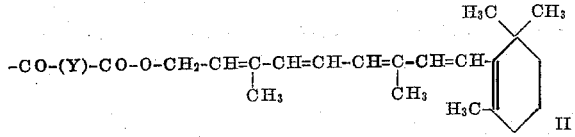

wherein Y has the meaning as defined above.

Still a further object of this invention is to provide new water-dispersible compounds of Formula I which are useful in the preparation of pharmaceutical products and as additives for enriching foods and feeds with vitamin A.

According to the present invention the compounds of Formula I are prepared by reacting vitamin A alcohol in the presence of a basic agent with an acid halide of a compound having the general formula

wherein Y represents a divalent radical selected from the group consisting of saturated and unsaturated alkylene radicals containing from 2 to 3 carbon atoms, $n$ represents a number from about 4 to about 45, and $R_1$ represents a member selected from the group consisting of alkyl and the radical

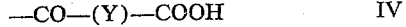

wherein Y has the meaning as defined above.

The acid halides required as starting materials for carrying out the process of this invention can be obtained by reacting the anhydride of a dicarboxylic acid having from 4 to 5 carbon atoms with polyethylene glycol or a mono-alkyl ether thereof, and treating the reaction product with a halogenating agent of the type used for preparing acid halides. Suitable dicarboxylic acid anhydrides include in particular succinic acid anhydride, and, furthermore, glutaric acid anhydride, maleic acid anhydride, and citraconic acid anhydride. These anhydrides react easily and almost completely with the polyethylene glycols as well as with the mono-alkyl ethers thereof. If mono-alkyl ethers of polyethylene glycol are used, the corresponding mono-half esters will be formed, whereas, if polyethylene glycol is used, the corresponding di-half esters will be formed. For the complete formation of the di-half esters two moles of acid anhydride are required for each mole of polyethylene glycol. The free carboxylic group of the thus obtained mono- or di-half esters can be converted into the acid halide group by treatment with conventional halogenating agents. The chain length of the polyethylene glycol or its mono-alkyl ethers used as starting compounds may vary within wide limits. In order to obtain easily water-dispersible products it is convenient to use polyethylene glycol having an average molecular weight of at least about 300, preferably from about 600 to about 2000, or polyethylene glycol mono-methyl ether having an average molecular weight of at least about 240, preferably between about 350 and about 750 or polyethylene glycol mono-ethyl ether having an average molecular weight of at least about 260, preferably between about 350 and about 750.

In accordance with the present invention the acid halides prepared as described above are reacted with vitamin A alcohol. If polyethylene glycol mono-alkyl ether mono-acyl halides are used, the reaction with vitamin A is effected with equimolecular amounts of the reaction components whereas, if polyethylene glycol di-acyl halides are used, two moles of vitamin A are reacted with one mole of acyl halide. This condensation is effected in the presence of a basic agent, such as pyridine, collidine, and the like, preferably in a solvent, such as toluene or benzene, at 0–20° C.

The products of the present invention are diesters of dibasic acids in which one carboxylic group is esterified with vitamin A alcohol, whereas the other carboxylic group is esterified with the polyethylene glycol radical. The terminal hydroxyl group of the polyethylene glycol radical is either etherified (if polyethylene glycol mono-alkyl ethers are used as starting compounds) or esterified with a second mole of dicarboxylic acid esterified with vitamin A alcohol. The new products of this invention are pale yellow to brownish, highly viscous substances which can be readily dispersed in water without using any auxiliary agents. When the products according to this invention are allowed to stand in the form of aqueous dispersions, they gradually undergo saponification. The new compounds possess an absorption maximum in the ultraviolet spectrum at 326 mμ and display the total biological activity corresponding to the vitamin A content. In the human or animal organism they decompose rapidly into vitamin A alcohol and water-soluble, practically non-toxic products which are no longer surface-active. As the new esters are moreover readily resorbed from aqueous and other solutions, they are useful in the manufacture of pharmaceutical products and for enriching foods and feeds with vitamin A.

The present invention will now be illustrated by the following examples, however without being limited thereto.

Example 1

35 g. of polyethylene glycol mono-methyl ether having an average molecular weight of 350 were dried in vacuo at 80° C. for one hour and then reacted with 10 g. of succinic acid anhydride by heating at 170° C. for 2½ hours. This reaction resulted in the formation of the acid succinic acid ester in a yield of practically 100%. The ester acid was boiled for half an hour with 40 g. of thinoyl chloride, and thereafter the excess thionyl chloride was completely removed. There was thus obtained the acid chloride of the ester acid.

20 ml. of benzene were added to the acid chloride, and the mixture was gradually combined at 12° C. with a solution of 28.6 g. of vitamin A alcohol and 10 ml. of pyridine in 80 ml. of benzene. The mixture was allowed to stand overnight at 15° C., and the precipitated pyridine hydrochloride was separated by filtration. The filtrate was extracted successively with totally 4 portions of 50 g. of alumina, and after filtration the filtrate was concentrated in vacuo. [The alumina used for this treatment was prepared by adding 12 ml. of water to 100 g. of freshly activated alumina (of the type usually used in chromatography).] For stabilising the residue 0.5% of DL-α-tocopherol or of any other suitable antioxidant was added thereto. The reaction product was extracted twice with low-boiling petroleum ether to remove any excess vitamin A alcohol. After removal of residual solvent in a high vacuum the product had a purity of about 90% as determined by measuring the U. V. absorption and calculating the molecular weight. $n_D = 1.5335$; saponification number 102.6%, based on the calculated value.

The (vitamin A)-(methoxy polyethylene glycol-350) succinate obtained as described above is readily soluble in water, chloroform, benzene, alcohol and other solvents. On heating, aqueous solutions of this compound become turbid at about 40° C. If a polyethylene glycol mono-methyl ether of higher molecular weight is used, it is possible to obtain products the aqueous solutions of which get turbid at higher temperatures only.

This vitamin A ester can be subjected to chromatography from a benzene solution on alumina having the above mentioned activity. The quality of the vitamin A ester is, however, not substantially influenced by this treatment.

Example 2

55 g. of polyethylene glycol mono-methyl ether having an average molecular weight of 550 were reacted, in a manner similar to that described in Example 1, with succinic acid anhydride and vitamin A. After purification the product, i. e. the (vitamin A)-(methoxy polyethylene glycol-550) succinate was obtained, in a yield of 61%. The product had a purity of 95.2%, as determined by measuring the absorption in the U. V. spectrum; the product was readily soluble in water.

Example 3

50 g. of polyethylene glycol having an average molecular weight of 1000 were dried by heating in vacuo and then heated together with 10 g. of succinic acid anhydride for 2 hours to 180° C. The reaction resulted in the quantitative formation of the corresponding acid disuccinate which was subsequently converted into the diacid chloride by means of 60 g. of thionyl chloride. After removal of the excess thionyl chloride, there were added to the acyl chloride first 40 ml. of toluene and then at 10° C. a solution of 28.6 g. of vitamin A alcohol and 15 g. of pyridine in 80 ml. of toluene. This mixture was allowed to stand for 12 hours, the pyridine hydrochloride was then removed by filtration, and the filtrate was further processed in the manner described in Example 1. The resulting yellow-brownish highly viscous reaction product contained about 85% of (polyethylene glycol-1000)-di-(vitamin A succinate) as determined by measuring the vitamin A content and calculating the average molecular weight.

I claim:

1. A compound having the general formula

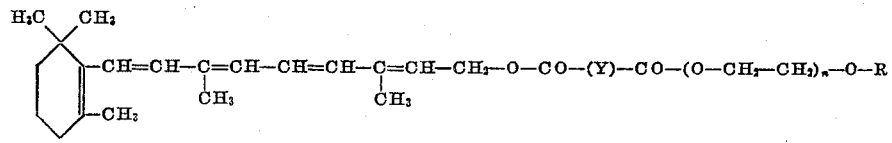

wherein Y represents a divalent alkylene radical containing from 2 to 3 carbon atoms, $n$ represents a number from about 4 to about 45, and R represents a member selected from the group consisting of lower alkyl and the radical

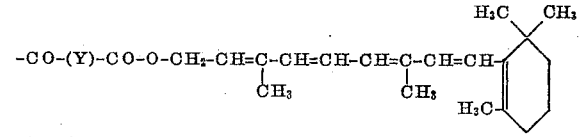

wherein Y has the meaning as defined above.

2. A compound according to claim 1 wherein R is lower alkyl and $n$ is a number from about 6 to about 17.

3. A compound according to claim 1 wherein $n$ is a number from about 13 to about 45 and R is the radical

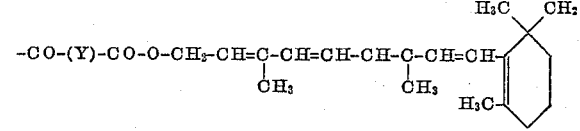

wherein Y has the meaning as defined in claim 1.

4. (Polyethylene glycol-1000)-di-(vitamin A succinate).

5. (Vitamin A)-(methoxy polyethylene glycol-350) succinate.

6. (Vitamin A)-(methoxy polyethylene glycol-550) succinate.

References Cited in the file of this patent

UNITED STATES PATENTS

| | | |
|---|---|---|
| 2,169,195 | Hickman et al. | Aug. 8, 1939 |
| 2,363,045 | De Groote et al. | Nov. 21, 1944 |
| 2,443,473 | Milas | June 15, 1948 |
| 2,541,285 | Rawlins | Feb. 13, 1951 |